United States Patent [19]
Sasaki

[11] Patent Number: 5,575,075
[45] Date of Patent: Nov. 19, 1996

[54] THICKNESS DETECTING DEVICE

[75] Inventor: Yoshiyuki Sasaki, Tokyo, Japan

[73] Assignee: Juki Corporation, Tokyo, Japan

[21] Appl. No.: 345,990

[22] Filed: Nov. 28, 1994

[30] Foreign Application Priority Data

Nov. 30, 1993 [JP] Japan .................................. 5-299928

[51] Int. Cl.⁶ .................. G01B 7/06; G01B 5/06
[52] U.S. Cl. .................. 33/501.02; 33/503; 33/832; 33/834
[58] Field of Search .................. 33/501.02, 501.03, 33/832, 833, 503, 558, 561, 834

[56] References Cited

U.S. PATENT DOCUMENTS

| | | | |
|---|---|---|---|
| 3,332,153 | 7/1967 | Loewen | 33/558 X |
| 4,068,385 | 1/1978 | Mitzel | 33/501.03 |
| 4,338,722 | 7/1982 | Delmas | 33/561 |
| 4,442,607 | 4/1984 | Sakata et al. | 33/503 X |
| 4,530,159 | 7/1985 | Ernst | 33/558 X |
| 4,964,221 | 10/1990 | Breyer et al. | 33/503 |
| 5,031,331 | 7/1991 | Herzog et al. | 33/503 |

FOREIGN PATENT DOCUMENTS 8301301  4/1983  WIPO .................................. 33/832

*Primary Examiner*—Christopher W. Fulton
*Attorney, Agent, or Firm*—McCormick, Paulding & Huber

[57] ABSTRACT

A sheet thickness sensing apparatus adapted to sense variations in thickness of sheet materials or documents such as printouts, invoices, and direct mails irrespective of dimensions of each document. The thickness sensing apparatus includes a main body, a sensor unit, a sheet light source, a photosensor, a douser or a light intercepting member, a crank, a motor, and a conveyor table. The main body is so supported on a slide rod as to move in one direction. The slide rod is in turn supported by support plates so as to move in a direction perpendicular to the direction of the main body. The sheet thickness of each document is optically and mechanically sensed.

7 Claims, 4 Drawing Sheets

THICKNESS DETECTING DEVICE

BACKGROUND OF THE INVENTION

1. Technical Field

This invention relates to a sheet thickness sensor, and more particularly to a device or an apparatus for sensing a thickness of articles as conveyed or fed over a conveyor path or the like.

2. Prior Art

Recently, a large amount of sealed documents such as direct mail, debit notes and the like are conveyed or mailed from businesses to customers by mail and the like. It is required to check such documents, with respect to weight and/or thickness.

It is generally practiced to mail a large number of documents such a printouts, invoices, and direct mails in the same format to addressees. As illustration of mail processing, the example of inserting and sealing the invoices into each envelope may be explained as follows.

Usually, debit notes in the form of a continuous sheet containing the address and required information with each document being cut and folded to a predetermined size and placed in an envelope together with necessary enclosures by utilizing a mail forming apparatus. Such a process is effected automatically. To minimize errors in forming the envelopes, there has been utilized a thickness detecting device for measuring the thickness of each of the envelopes being conveyed on a transporting passage.

However, prior art thickness detecting devices are not satisfactory in terms of reliability and applicability.

An object of the invention is to provide a thickness detecting device which can accurately detect the thickness of an article being conveyed on a transporting passage at a desired location.

SUMMARY OF THE INVENTION

An object of the invention is to overcome the above mentioned problems in the prior art device.

According to the invention there is provided a thickness detecting device comprising a thickness detecting portion for detecting the thickness of an article being detected, and means for adjusting the position of the thickness detecting portion relative to a plane defining a transporting passage along which the article being detected is transported, so that the thickness at a desired location of the article can be detected.

BRIEF DESCRIPTION OF THE DRAWINGS

Further objects and advantages of the invention will become apparent from the following descriptions in conjunction with attached drawings in which.

DESCRIPTION OF PREFERRED EMBODIMENTS

Figure 4:
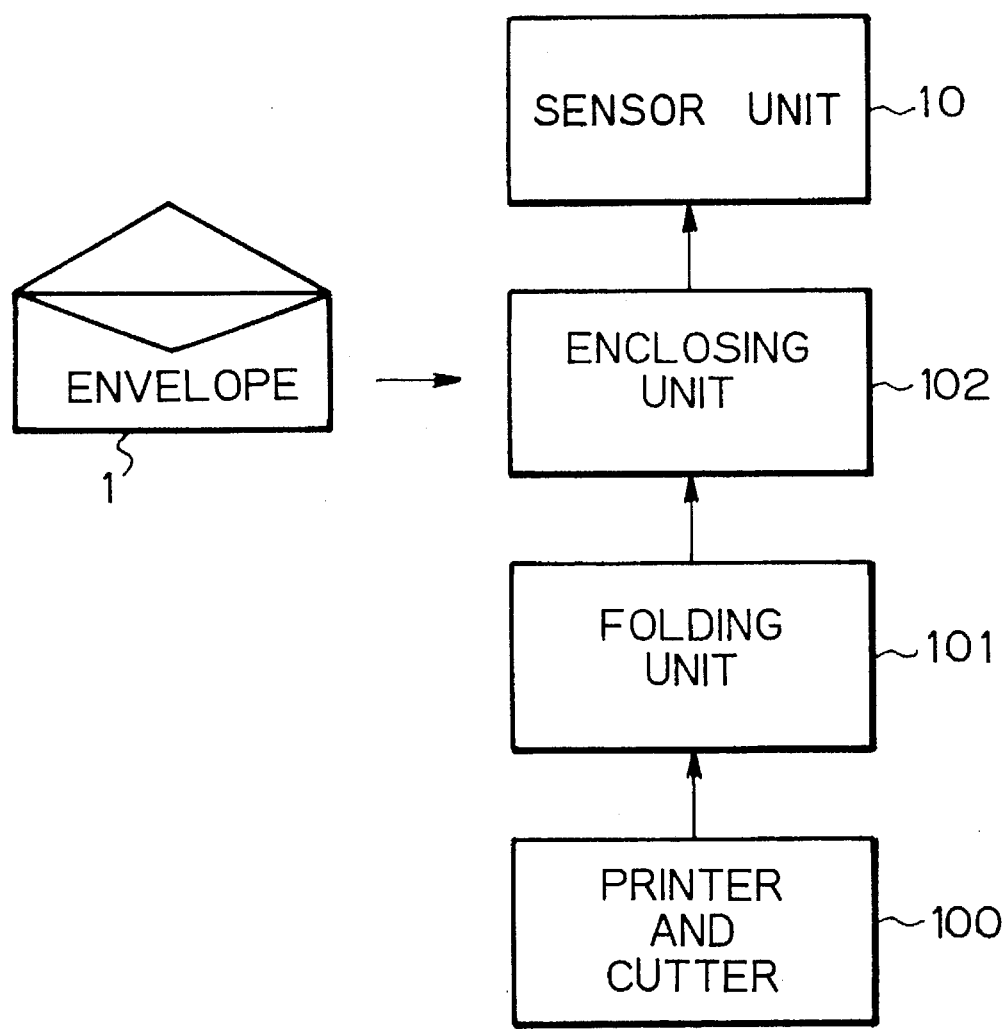
FIG. 4 is a flow chart of the mails processed under the mail system.

FIG. 4 shows a prior art mail processing system, in which numeral 100 designates a printer and cutter unit which prints on a continuous paper desired matters and cuts the paper into sheets. A folding unit 101 folds the sheet, and the folded sheet is enclosed into an envelope at an enclosing unit 102. As shown in the drawing, envelopes 1 are supplied to the enclosing unit 102.

In the mail system shown in FIG. 4, it is required to provide a thickness detecting unit 10 to check the thickness of respective envelopes so as to determine whether the enclosures of a predetermined number of sheet have been enclosed in respective envelopes or not.

The thickness detection of the thickness detection unit 10 is performed after the enclosures have been enclosed in each of the envelopes and prior to or after the flap of the envelope is sealed. When an error is detected, the operation is repeated. In the prior art system, the thickness of an envelope is detected only at a predetermined location due to mechanical restraints.

Figure 3:
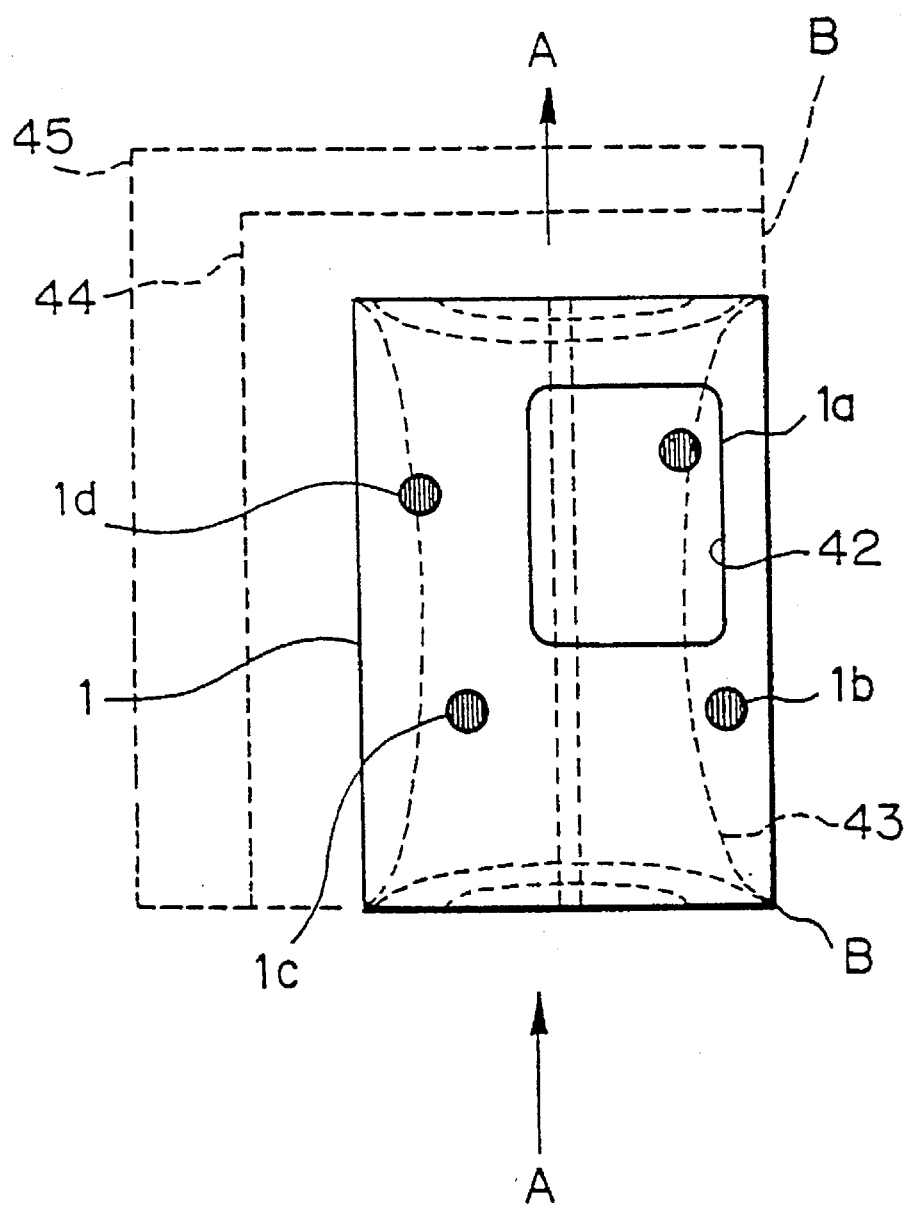
FIG. 3 is a schematic plan view explanatory of the manner in which the envelope would be susceptible to deformation under the process.

FIG. 3 shows the envelope 1 located in the thickness detection unit 10. The envelope 1 is carried into and out of the unit 10 in the direction of arrow A. The size of the envelope 1 may change as shown in broken lines 44 and 45, however, one side (right side in FIG. 3) of the envelope 1 is guided along a guide (not shown in the drawing) of a transporting mechanism (not shown also), and the one side moves along a solid line B—B. Since the location of the thickness detecting portion is fixed, the thickness detecting portion may be located at positions 1a, 1b, 1c or 1d in FIG. 3 according to the size of the envelope 1. The position 1a corresponds to a window portion 42 of the envelope, the position 1b to a flap portion and position 1d to a boundary portion, which positions may cause errors in detecting the thickness. The position 1c shows a suitable position.

When the thickness detection is performed at an unsuitable position, there may result an error such that a correct envelope is determined to be an error and vice versa.

Figure 1:
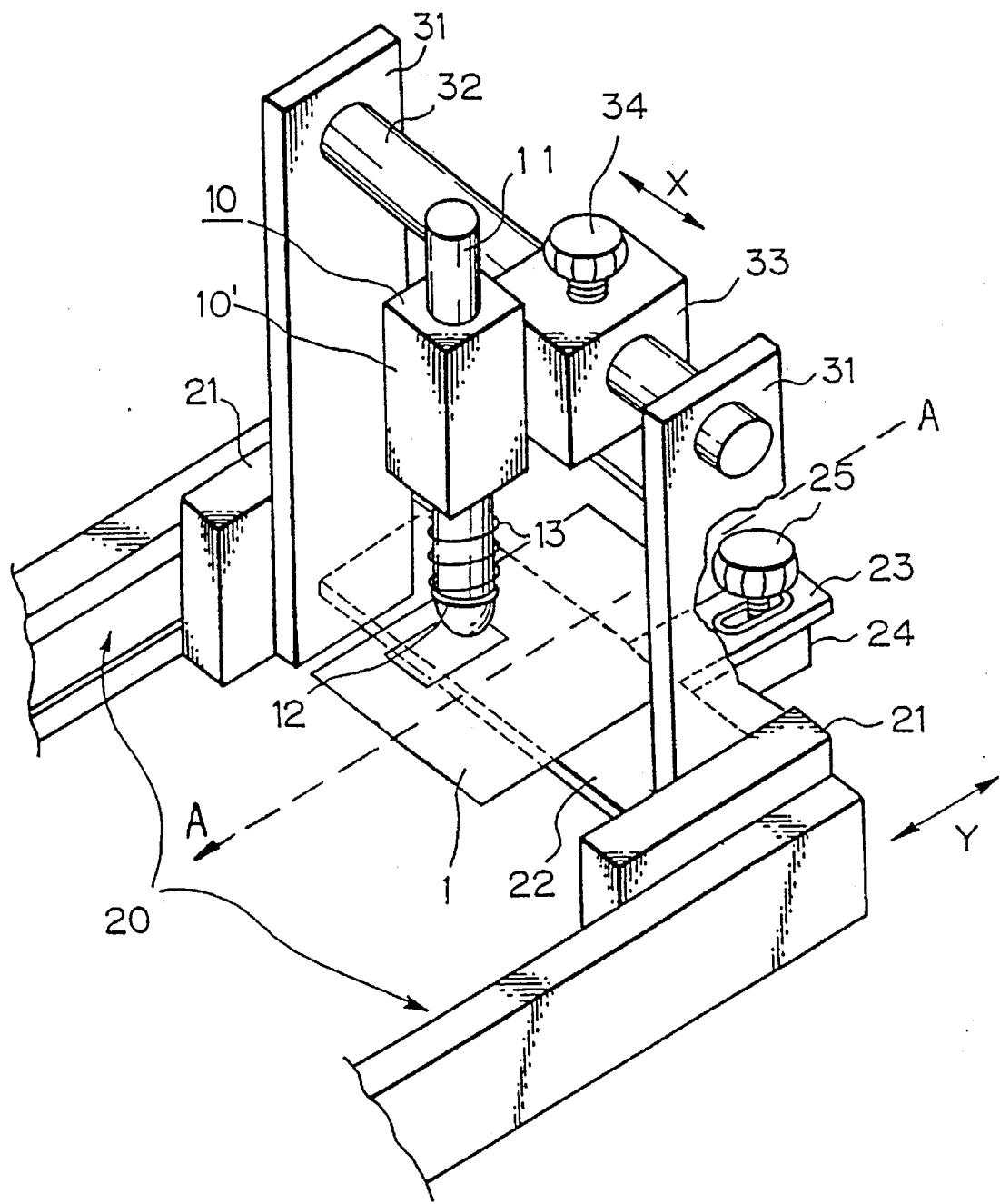
FIG. 1 is a perspective view of a sensor unit embodying the present invention.

The present invention solves the above-mentioned problems. FIG. 1 is a schematic view of an essential portion of a thickness detection unit 10. Shown at numeral 10' is a guide portion for vertically movably supporting a detecting rod 11 and the guide portion 10' is supported on a main body 33.

Figure 2:
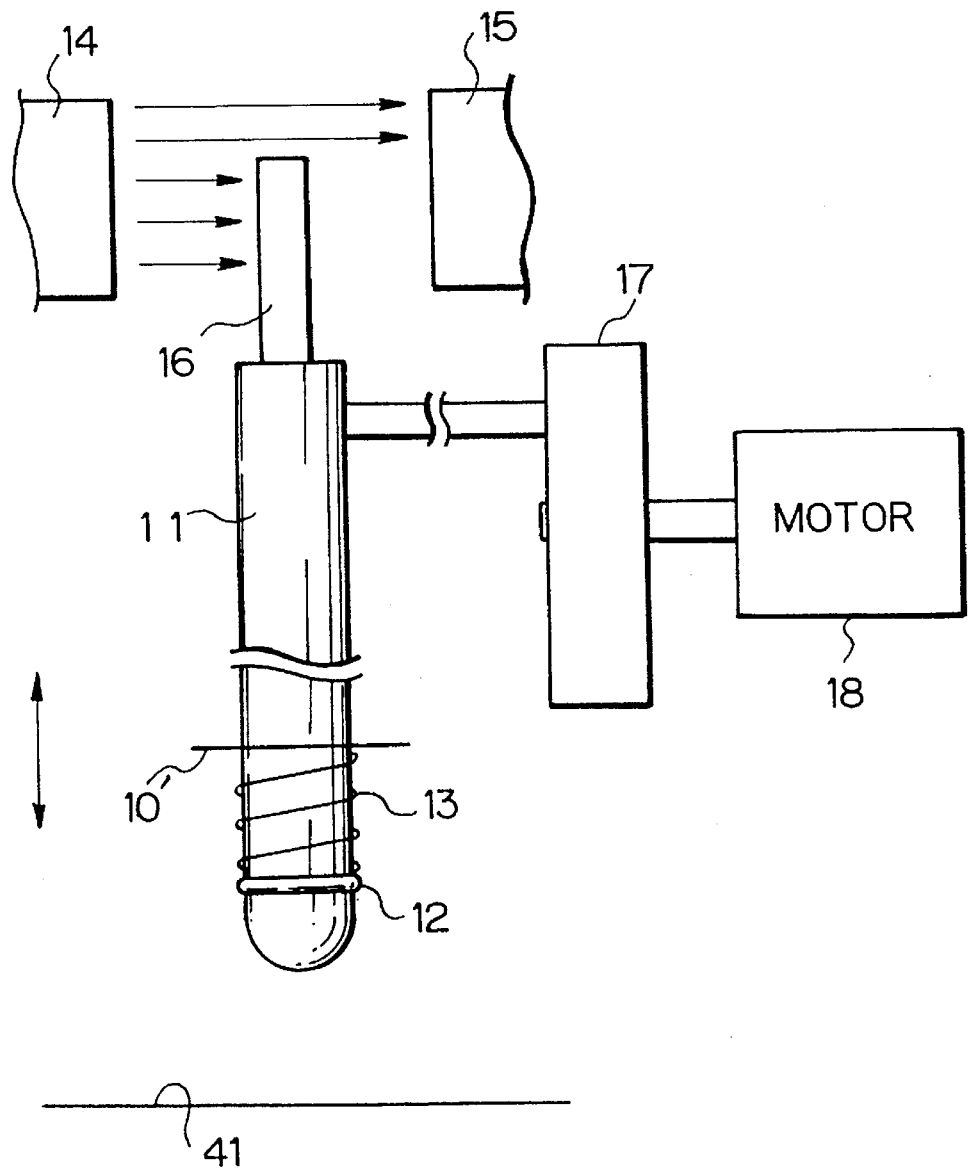
FIG. 2 is a schematic representation of a sensor rod shown in FIG. 1.

The detecting rod 11 is vertically driven by a mechanism provided in the main body 33 and shown schematically in FIG. 2, and detects the thickness of envelopes 1 which are sequentially driven in direction of the arrow A.

As shown in FIG. 2, an upper portion of the detecting rod 11 is guided through the guide portion 10' (only the lower surface thereof is shown in FIG. 2) and is connected to a crank 17 which is rotatingly driven by a motor 18 through a joint mechanism not shown in FIG. 2. Thus, the detecting rod 11 moves toward and away from a transport table 41 on which envelopes 1 are transported.

In detecting the thickness of an envelope, the detecting rod 11 moves downwardly until the tip end thereof touches the transport table 41. There is provided a spring 13 between the lower surface of the guide portion 10' and a flange 12 provided near to the tip end of the detecting rod 11 so as to permit upward movement of the detecting rod 11 by the amount of the thickness of the envelope 1 which is clamped between the tip end of the detecting rod 11 and the transport table 41. The joint mechanism between the crank 17 and the detecting rod 11 permits the upward movement of the detecting rod 11 by the thickness of the envelope 1.

There is provided an optical detector comprising a sheet-like light source 14, a light intercept member 16 provided on a suitable position of the detecting rod 11, and a light sensor 15 to detect the thickness of the envelope 1. In the drawing, the light intercept member 16 is provided on the upper end of the detecting rod 11, but the light intercept member 16 may be provided at any suitable position of the detecting rod 11.

The detected height of the detecting rod 11 or the thickness of the envelope 1 on the transport table 41 is compared with the reference value of the thickness of the envelope 1 having a predetermined enclosures and being measured beforehand, and which permits a determination of whether the envelope 1 includes the appropriate enclosures.

The location of the detecting mechanism shown in FIG. 1 can be adjusted relative to the transport passage (such as A—A) of the envelope 1 so that the thickness detection is not performed at unsuitable positions such as 1a, 1b, 1d and the like shown in FIG. 3.

The main body portion 33 supporting the guide portion 10' of the detecting rod 11 and the mechanism shown in FIG. 2 is supported on a slide rod 32 through a slide bush (not shown in the drawing) so as to displace in X directions and, a screw 34 is provided to fix the position on the slide rod 32.

The opposite ends of the slide rod 32 are supported by supporting plates 31 and 31, the lower ends of the plates 31 and 31 being supported respectively on supporting blocks 21 and 21.

Further, the supporting blocks 21 and 21 are supported on slide guides 20 and 20 respectively and, are slidable in the directions Y.

A screw 25 is provided to adjust and fix the positions of the supporting blocks 21 and 21 in directions Y. The screw 25 extends through an elongated opening provided in a projecting portion 23 of a bottom plate 22 which is secured respectively to the lower ends the supporting plates 31 and 31, and the screw 25 is screw-threaded into a female screw block 24 which is secured to a chassis not shown in the drawing.

Thus, the position of the detecting rod 11 in X and Y directions with respect to the transporting passage A—A of the envelope 1 can be determined as desired within the range of the distance between the supporting plates 31 and 31 and between the slide guides 20 and 20.

Accordingly, by adjusting the position of the detecting rod 11 utilizing an envelope 1 in which a predetermined enclosures are normally enclosed in order to measure the reference value of the thickness, and securing the position by the screws 25 and 34, thereby adjusting the position of the detecting rod 11 relative to the plane including the transport passage of the envelope, it is possible to detect the thickness of the envelope at suitable position (such as 1c in FIG. 3) of the envelope and to prevent errors.

In the embodiment, an optical sensor is utilized to detect the height of the detecting rod 11, but another mechanism such as a magnetic sensor and the like can also be utilized. Further, the embodiment measures the thickness of envelopes, but the invention can be applied to any type of thickness or height measuring devices.

As described heretofore, according to the invention, it is possible to detect accurately the thickness of an article at any desired location in the article being conveyed on a predetermined position on a transporting passage, irrespective to the size, configuration and the like of the article.

I claim:

1. A thickness detecting device for an envelope sealed by a mail inserting and sealing machine and transported along a predetermined path form the inserting and sealing machine, comprising:

a thickness detecting rod (11) supported slideably in vertical directions on a guide portion (10') for detecting the thickness of the envelope transported along the predetermined path from the mail inserting and sealing machine;

means for adjusting the position of said thickness detecting rod (11) relative to a plane defining a portion of the predetermined path along which the envelope is transported to detect the thickness of the envelope at a desired location on the envelope, said means for adjusting the position including a main body (33) supported slideably in X directions perpendicular to the path on a slide rod (32) having opposite ends and supporting said guide portion (10'), and a structure (31, 31, 22, 21, 21) supporting said slide rod (32) slideably in Y directions perpendicular to the X directions and relative to the path, said structure (31, 31, 22, 21, 21) supporting said slide rod (32) including a pair of supporting plates (31, 31) supporting said opposite ends of said slide rod (32), a bottom plate (22) secured to and extending between said supporting plates (31, 31) and defining said plane, and supporting blocks (21, 21) supporting said supporting plates (31, 31 ) respectively, said supporting blocks (21, 21) being integrally connected to each other and sliceable in said Y-directions which are perpendicular to said X directions; and an electric motor (18) for vertically driving said detecting rod (11).

2. A thickness detecting device according to claim 1 including a fixing means (34) on said slide rod (32) for releasably securing said main body (33) in fixed portion relative to said slide rod (32) and to the path.

3. A thickness detecting device according to claim 2 including slide guides (20, 20) fixed to a stationary member disposed in fixed position relative to the predetermined path and wherein said supporting blocks (21, 21) are slidably supported for limited sliding movement on said slide guides (20, 20) by a fixing means (25).

4. A thickness detecting device according to claim 1, wherein the device includes an optical detecting device for measuring the position of the detecting rod (11).

5. A thickness detecting device according to claim 4, wherein said optical detecting device comprises a light source (14) and a light sensor (15) mounted on a stationary member, and a light intercepting member mounted on said detecting rod (11) and located between said light source and said light sensor.

6. A thickness detecting device for an envelope sealed by a mail inserting and sealing machine and transported along a predetermined path from the inserting and sealing machine, comprising:

a thickness detecting rod (11) supported slideably in vertical directions on a guide portion (10') for detecting the thickness of the envelope fed along the predetermined path from the mail inserting and sealing machine;

means for adjusting the position of said thickness detecting rod (11) relative to a plane defining a portion of the predetermined path along which the envelope is transported to detect the thickness of the envelope at a desired location on the envelope, said means for adjusting the position including a main body (33) supported slideably in X directions perpendicular to the predetermined path and on a slide rod (32) having opposite ends, and a structure (31, 31, 22, 21, 21) supporting said slide rod (32) slideably in Y directions perpendicular to the X directions and relative to said plane, said main body (33) supporting said guide portion (10') and including a first fixing means (34) for releasably securing said main body to said slid rod (32), said construction (31, 31, 22, 21, 21) supporting said slide rod (32) comprises a pair of supporting plates (31, 31) supporting said opposite ends of said slide rod (32), a bottom plate (22) secured to and extending between said supporting plates (31, 31) and defining said plane and supporting blocks (21, 21) supporting said supporting plates (31, 31) respectively, said supporting blocks (21, 21) being integrally connected to each other and slideable in said Y directions and along slide guides (20, 20) fixed to a stationary member mounted in fixed position relative to the mail inserting an sealing machine, second fixing means (25) for releasably securing said supporting blocks (21, 21) to said slide guides (20, 20)

an optical detecting device for measuring the position of the detecting rod (11); and an electric motor (18) for vertically driving said detecting rod (11).

7. A thickness detecting device according to claim 6, wherein said optical detecting device comprises a light source (14) and a light sensor (15) mounted on a stationary member, and a light intercepting member mounted on said detecting rod (11) and located between said light source and said light sensor.

* * * * *